(12) United States Patent
Konno et al.

(10) Patent No.: US 12,227,611 B2
(45) Date of Patent: Feb. 18, 2025

(54) COMPOSITION AND CURED PRODUCT OF SAME

(71) Applicant: DAICEL CORPORATION, Osaka (JP)

(72) Inventors: Takashi Konno, Tokyo (JP); Naritoshi Maetsu, Tokyo (JP); Jun Watanabe, Tokyo (JP); Shintarou Hatanaka, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 317 days.

(21) Appl. No.: 17/760,980

(22) PCT Filed: Sep. 11, 2020

(86) PCT No.: PCT/JP2020/034443
§ 371 (c)(1),
(2) Date: Mar. 16, 2022

(87) PCT Pub. No.: WO2021/054256
PCT Pub. Date: Mar. 25, 2021

(65) Prior Publication Data
US 2022/0389149 A1 Dec. 8, 2022

(30) Foreign Application Priority Data
Sep. 17, 2019 (JP) .................. 2019-168879

(51) Int. Cl.
| | | |
|---|---|---|
| *C08G 18/46* | (2006.01) | |
| *C08G 18/38* | (2006.01) | |
| *C08G 18/42* | (2006.01) | |
| *C08G 18/44* | (2006.01) | |
| *C08G 18/61* | (2006.01) | |
| *C08G 18/79* | (2006.01) | |
| *C08G 77/46* | (2006.01) | |
| *C08J 7/04* | (2020.01) | |
| *C08L 75/06* | (2006.01) | |
| *C08L 85/04* | (2006.01) | |
| *C09D 7/20* | (2018.01) | |
| *C09D 7/65* | (2018.01) | |
| *C09D 175/06* | (2006.01) | |

(52) U.S. Cl.
CPC ..... *C08G 18/4661* (2013.01); *C08G 18/3851* (2013.01); *C08G 18/4202* (2013.01); *C08G 18/4277* (2013.01); *C08G 18/44* (2013.01); *C08G 18/61* (2013.01); *C08G 18/791* (2013.01); *C08G 18/792* (2013.01); *C08J 7/04* (2013.01); *C08J 7/0427* (2020.01); *C08L 75/06* (2013.01); *C08L 85/04* (2013.01); *C09D 7/20* (2018.01); *C09D 7/65* (2018.01); *C09D 175/06* (2013.01); *C08G 77/46* (2013.01); *C08J 2367/02* (2013.01); *C08J 2375/06* (2013.01); *C08J 2475/04* (2013.01)

(58) Field of Classification Search
CPC ............ C08G 18/4661; C08G 18/4277; C08G 18/61; C08G 18/3851; C08G 18/44; C08G 77/46; C08G 18/4202; C08G 18/792; C08G 18/791; C08J 7/0427; C08J 2375/06; C08J 2367/02; C08J 2475/04; C08J 7/04; C08L 75/06; C08L 85/04; C09D 175/06; C09D 7/20; C09D 7/65
See application file for complete search history.

(56) References Cited

U.S. PATENT DOCUMENTS

| | | | |
|---|---|---|---|
| 11,859,044 B2 * | 1/2024 | Konno | ................ C09D 175/12 |
| 2005/0027095 A1 | 2/2005 | Wamprecht et al. | |
| 2012/0238667 A1 | 9/2012 | Gotou et al. | |

FOREIGN PATENT DOCUMENTS

| | | | | |
|---|---|---|---|---|
| EP | 327886 A | * | 8/1989 | ............. C08G 77/26 |
| JP | 4-130119 A | | 5/1992 | |
| JP | 2011-137145 A | | 7/2011 | |
| JP | 2013-1897 A | | 1/2013 | |

OTHER PUBLICATIONS

International Preliminary Report on Patentability and Written Opinion of the International Searching Authority for International Application No. PCT/JP2020/034443, dated Mar. 15, 2022, with English translation.
International Search Report for International Application No. PCT/JP2020/034443, dated Dec. 1, 2020, with an English translation.
Extended European Search Report for European Application No. 20864612.5, dated Aug. 24, 2023.

* cited by examiner

*Primary Examiner* — Rabon A Sergent
(74) *Attorney, Agent, or Firm* — Birch, Stewart, Kolasch & Birch, LLP

(57) ABSTRACT

Provided is a composition capable of forming a cured product having excellent adhesion to a substrate, hardness, scratch resistance, and chemical resistance. The composition of the present disclosure includes a polyol compound (A) and an isocyanate compound (B), the polyol compound (A) containing a compound (a1) having a number average molecular weight calibrated with polystyrene standards of less than 800 and being represented by Formula (1), where $R^1$ to $R^3$ are a group represented by Formula (1a); and the isocyanate compound (B) containing a compound (b) represented by Formula (2), where $L^1$ to $L^3$ are a hydrogen atom, an NCO group, or an alkyl group having from 1 to 10 carbon atom(s) and having a group represented by Formula (2').

8 Claims, No Drawings

COMPOSITION AND CURED PRODUCT OF SAME

TECHNICAL FIELD

The present disclosure relates to a composition for polyurethane resin molding and a cured product of the same. The present application claims priority from the Japanese Patent Application No. 2019-168879, filed in Japan on Sep. 17, 2019, the contents of which are incorporated herein by reference.

BACKGROUND ART

Polyurethane resins have flexibility, elasticity, and strength. Thus, compositions for polyurethane resin molding are used in coating agents and the like.

The coating agents are used, for example, to cover plastic substrates constituting vehicle parts, electronic devices, and the like, and such a coating agent is required to form a coating having adhesion to the substrate, hardness, and scratch resistance properties. Examples of such a coating agent include compositions described in Patent Documents 1 and 2.

However, if agents such as a sunscreen come into contact with a coating including a polyurethane resin, the coating is peeled off, causing appearance of the coating to be spoiled, which is problematic.

CITATION LIST

Patent Document

Patent Document 1: JP 04-130119 A
Patent Document 2: JP 2011-137145 A

SUMMARY OF INVENTION

Technical Problem

Thus, an object of the present disclosure is to provide a composition capable of forming a cured product having excellent adhesion to a substrate, hardness, scratch resistance, and chemical resistance.

Another object of the present disclosure is to provide a cured product having excellent adhesion to a substrate, hardness, scratch resistance, and chemical resistance.

Yet another object of the present disclosure is to provide vehicle parts having at least a portion of their surfaces is covered with a cured product having excellent adhesion to a substrate, hardness, scratch resistance, and chemical resistance.

Still another object of the present disclosure is to provide a housing having at least a portion of its surface is covered with a cured product having excellent adhesion to a substrate, hardness, scratch resistance, and chemical resistance, and an electronic device including the housing.

Solution to Problem

As a result of diligent research to solve the problems described above, the present inventors have found that a polyurethane resin obtained by reacting a polyol compound having an isocyanurate skeleton with a polyisocyanate compound having an isocyanurate skeleton has excellent adhesion to a substrate, hardness, and scratch resistance, as well as excellent chemical resistance. The present disclosure was completed based on these findings.

That is, the present disclosure provides a composition containing a polyol compound (A) and an isocyanate compound (B), the polyol compound (A) containing a compound (a1) having a number average molecular weight calibrated with polystyrene standards of less than 800, the compound (a1) being represented by Formula (1):

[Chem. 1]

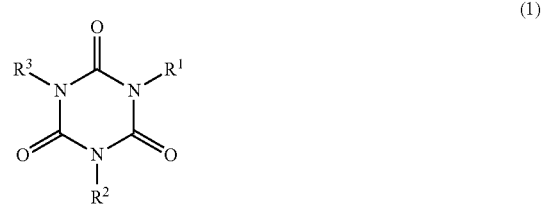

where in Formula (1), $R^1$ to $R^3$, each identical or different, are a group represented by Formula (1a):

[Chem. 2]

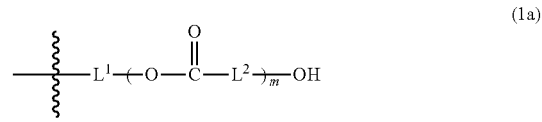

where in Formula (1a), $L^1$ and $L^2$, each identical or different, represent an alkylene group having from 1 to 10 carbon atom(s), and m represents a number of 0 or greater, except m does not simultaneously take 0 for $R^1$ to $R^3$, and a bond with a wavy line binds to a nitrogen atom in the formula; and the isocyanate compound (B) containing a compound (b) represented by Formula (2):

[Chem. 3]

where in Formula (2), $L^3$ to $L^5$, each identical or different, represent a hydrogen atom, an NCO group, or an alkyl group having from 1 to 10 carbon atom(s) and having a group represented by Formula (2'), except $L^3$ to $L^5$ do not simultaneously take 0:

[Chem. 4]

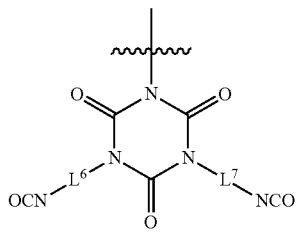

(2')

where in Formula (2'), $L^6$ and $L^7$, each identical or different, represent an alkylene group having from 1 to 10 carbon atom(s), and a bond with a wavy line binds to a carbon atom of the alkyl group having from 1 to 10 carbon atom(s) in $L^3$ to $L^5$ in Formula (2).

The present disclosure also provides the composition described above, in which the polyol compound (A) further contains a polyol (a2) in an amount ranging from 0.01 to 1.5 parts by weight relative to 1 part by weight of the compound (a1), the polyol (a2) having a hydroxyl value (KOH mg/g) from 30 to 300.

The present disclosure also provides the composition described above, in which an equivalent ratio of an NCO group in the isocyanate compound (B) to an OH group in the polyol compound (A), that is NCO/OH, is in a range from 0.2 to 2.0.

The present disclosure also provides the composition described above, further containing a polysiloxane derivative (C) in an amount from 0.1 to 0.5 parts by weight relative to 100 parts by weight of a total of the polyol compound (A) and the isocyanate compound (B).

The present disclosure also provides the composition described above, further containing a solvent represented by Formula (3):

[Chem. 5]

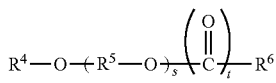

(3)

where in Formula (3), $R^4$ and $R^6$, each identical or different, represent a hydrogen atom or an alkyl group having from 1 to 5 carbon atom(s), $R^5$ represents an alkylene group having from 1 to 5 carbon atom(s), represents an integer of 1 or greater, and t represents 0 or 1, and when s is an integer of 2 or greater, each of a plurality of $R^5$ may be identical or different.

The present disclosure also provides the composition described above, in which the composition is a coating agent.

The present disclosure also provides a cured product of the composition described above.

The present disclosure also provides a plastic molded product, having at least a portion of its surface being covered with a coating including the cured product described above.

Advantageous Effects of Invention

The composition of the present disclosure can form a cured product having excellent adhesion to a substrate, hardness, scratch resistance, and chemical resistance. Thus, using the composition of the present disclosure as a coating agent to cover a substrate enables the substrate to have those properties described above.

The plastic molded product having at least a portion of its surface being covered with the cured product of the composition of the present disclosure has high surface hardness, excellent scratch resistance and chemical resistance. Thus, even touching the plastic molded product, for example, with a hand to which sunscreen is applied, does not cause the plastic cured product covering the surface to peel off or whiten, enabling the plastic molded product to retain excellent appearance, adhesion, hardness, and scratch resistance over a long period of time.

DESCRIPTION OF EMBODIMENTS

Embodiments of the present disclosure will be described in detail below.

Composition

The composition of the present disclosure contains a polyol compound (A) and an isocyanate compound (B). The composition of the present disclosure may contain an additional component other than the above components.

Polyol Compound (A)

The polyol compound (A) is a compound having a plurality of hydroxyl groups. The polyol compound (A) contains at least a polyester polyol compound (a1) represented by Formula (1):

[Chem. 6]

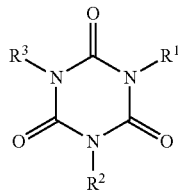

(1)

where $R^1$ to $R^3$ in the formula, each identical or different, are a group represented by Formula (1a):

[Chem. 7]

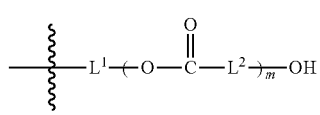

(1a)

where in Formula (1a), $L^1$ and $L^2$, each identical or different, represent an alkylene group having from 1 to 10 carbon atom(s), and m represents a number of 0 or greater, except m does not simultaneously take 0 for $R^1$ to $R^3$, and a bond with a wavy line binds to a nitrogen atom in the formula.

Examples of the alkylene group having from 1 to 10 carbon atom(s) in $L^1$ and $L^2$ include linear or branched alkylene groups, such as a methylene group, a methylmethylene group, a dimethylmethylene group, an ethylene group, a propylene group, a trimethylene group, a butylene group, a 1-methyltrimethylene group, a 2-methyltrimethylene group, a 1,1'-dimethylethylene group, a pentylene group, a hexylene group, a heptylene group, an octylene group, a 2-ethylhexylene group, a nonylene group, and a decylene group.

$L^1$ is, among others, preferably an alkylene group having from 1 to 3 carbon atom(s).

$L^2$ is, among others, preferably an alkylene group having from 1 to 8 carbon atom(s) and particularly preferably an alkylene group having from 4 to 6 carbon atoms. In addition, the alkylene group is preferably a linear alkylene group.

m described above is an average value of the degree of polymerization for the unit indicated with parentheses in Formula (1a) and is a number of 0 or greater, for example, from 0 to 7, preferably from 0 to 4, more preferably from 0 to 3, even more preferably from 0 to 2, and particularly preferably from 1 to 2.

The number average molecular weight of the compound (a1) (Mn, calibrated with polystyrene standards) is less than 800, preferably from 570 to 630, more preferably from 580 to 620, and even more preferably from 590 to 610.

In addition, a molecular weight dispersity (weight average molecular weight Mw/number average molecular weight Mn) of the compound (a1) is preferably from 1.0 to 1.5, more preferably from 1.0 to 1.3, and even more preferably from 1.0 to 1.2.

The hydroxyl value (KOH mg/g) of the compound (a1) is, for example, from 200 to 400, and in particular, from the viewpoint of improving the hardness and chemical resistance of the resulting cured product, the hydroxyl value is preferably from 260 to 300, more preferably from 270 to 290, and even more preferably from 275 to 285. The hydroxyl value can be measured by the hydroxyl value measurement method described in JIS-K1557.

The compound (a1) can be produced, for example, by ring-opening polymerization of the lactone using the hydroxyl group of Formula (1') below as a starting point. $L^1$ in Formula (1') is the same as $L^1$ in Formula (1a).

[Chem. 8]

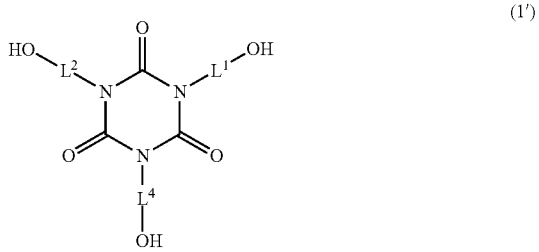

(1')

Examples of the lactone include α-acetolactone, β-propiolactone, γ-butyrolactone, δ-valerolactone, and ε-caprolactone.

The polyol compound (A) may contain an additional polyol compound other than the compound (a1). Examples of the additional polyol compound include polyester polyols other than the compound (a1), polyether polyols, and polycaprolactone polyols. These can be used alone, or in a combination of two or more.

Examples of the additional polyol compound include a polyol (a2) with a hydroxyl value (KOH mg/g) from 30 to 300. The composition containing the polyol (a2) tends to improve the flexibility of the resulting cured product.

The hydroxyl value (KOH mg/g) of the polyol (a2) is preferably from 30 to 300, more preferably from 40 to 270, and even more preferably from 50 to 250. With the hydroxyl value (KOH mg/g) of the polyol (a2) less than 30, the composition will be unlikely to achieve good scratch resistance and chemical resistance for the resulting cured product, and with the hydroxyl value (KOH mg/g) of the polyol (a2) exceeding 300, the composition will be unlikely to achieve sufficient flexibility for the resulting cured product. The hydroxyl value can be measured by the hydroxyl value measurement method described in JIS-K1557.

The number average molecular weight of the compound (a2) (Mn, calibrated with polystyrene standards) is, for example, preferably from 400 to 2500, more preferably from 450 to 2400, even more preferably from 500 to 2300, and particularly preferably from 500 to 2200. The molecular weight dispersity (weight average molecular weight Mw/number average molecular weight Mn) of the polyol (a2) is, for example, from 1 to 3.

The polyol (a2) is preferably a polycarbonate polyol, a polyester polyol, and/or a copolymer of these, and more preferably two hydroxy groups are contained in the molecule.

The polycarbonate polyol can be obtained by reacting a carbonic acid derivative such as, for example, diphenyl carbonate, dimethyl carbonate, diethyl carbonate, or phosgene.

Examples of the diol include aliphatic diols having no alicyclic skeleton, such as ethylene glycol, diethylene glycol, triethylene glycol, 1,2-propylene glycol, 1,3-propylene glycol, neopentyl glycol, 1,3-butanediol, 1,4-butanediol, 1,5-pentanediol, 2-methyl-1,5-pentanediol, 3-methyl-1,5-pentanediol, 1,6-hexanediol, 1,8-octanediol, 2-methyl-1,3-propane diol; aliphatic diols having an alicyclic skeleton, such as cyclohexanedimethanol, hydrogenated bisphenol A, hydrogenated bisphenol F, tricyclodecane dimethanol, and hydrogenated bisphenol A.

The polyester polyol can be obtained by ring-opening polymerization of the lactone or by reacting a diol with a dicarboxylic acid.

Examples of the lactone for use to obtain the polyester polyol (polylactone polyol) that can be obtained by ring-opening polymerization of the lactone include α-acetolactone, β-propiolactone, γ-butyrolactone, δ-valerolactone, and ε-caprolactone.

Examples of the diol include those similar to the diol to be used to form the polycarbonate polyol.

Examples of the dicarboxylic acid include oxalic acid, adipic acid, sebacic acid, fumaric acid, malonic acid, succinic acid, glutaric acid, azelaic acid, citric acid, 2,6-naphthalene dicarboxylic acid, phthalic acid, isophthalic acid, terephthalic acid, citraconic acid, 1,10-decanedicarboxylic acid, methyl hexahydrophthalic anhydride, hexahydrophthalic anhydride, methyl tetrahydrophthalic anhydride, and tetrahydrophthalic anhydride.

The copolymer can be obtained by copolymerizing the lactone, diol, dicarboxylic acid, and carbonic acid derivative described above.

The content of the polyol (a2) in the polyol compound (A) is not particularly limited, but from the viewpoint of improving the flexibility of the resulting cured product, the content is preferably from 0.01 to 1.5 parts by weight, more preferably from 0.03 to 1.2 parts by weight, even more preferably from 0.05 to 1.0 parts by weight, and particularly preferably from 0.08 to 0.9 parts by weight relative to 1 part by weight of the polyol compound (a1).

The content of the polyol (a2) in the polyol compound (A) is not particularly limited, but from the viewpoint of improving the flexibility of the resulting cured product, the content is preferably from 0.01 to 2.5 mol, more preferably from 0.03 to 2.0 mol, even more preferably from 0.05 to 1.5 mol, and particularly preferably from 0.08 to 1.0 mol per mol of the polyol compound (a1).

The number average molecular weight and the molecular weight dispersity of the polyol compound (A) can be measured with instruments and conditions described in Examples.

Isocyanate Compound (B)

The isocyanate compound (B) contains at least an isocyanate compound (b) represented by Formula (2):

[Chem. 9]

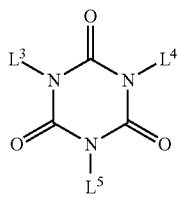

(2)

where in Formula (2), $L^3$ to $L^5$, each identical or different, represent a hydrogen atom, an NCO group, or an alkyl group having from 1 to 10 carbon atom(s) and having a group represented by Formula (2'), except $L^3$ to $L^5$ do not simultaneously take hydrogen atoms:

[Chem. 10]

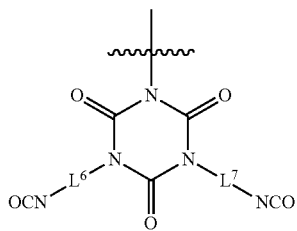

(2')

where in Formula (2'), $L^6$ and $L^7$, each identical or different, represent an alkylene group having from 1 to 10 carbon atom(s), and a bond with a wavy line binds to a carbon atom of the alkyl group having from 1 to 10 carbon atom(s) in $L^3$ to $L^5$ in Formula (2).

The alkyl group having from 1 to 10 carbon atom(s) in the $L^3$ to $L^5$ described above is preferably an alkyl group corresponding to the alkylene group $L^2$ in Formula (1a).

$L^3$ to $L^5$ described above are preferably an alkyl group having from 3 to 8 carbon atoms, and more preferably an alkyl group having from 4 to 8 carbon atoms. In addition, the alkyl group is preferably a linear alkyl group.

Examples of the alkylene group having from 1 to 10 carbon atom(s) in $L^6$ and $L^7$ described above include linear or branched alkylene groups, such as a methylene group, an ethylene group, a trimethylene group, a propylene group, a dimethylmethylene group, an isopropylene group, a butylene group, a 1-methyltrimethylene group, a 2-methyltrimethylene group, a 1,1'-dimethylethylene group, a pentylene group, a hexylene group, a heptylene group, an octylene group, a 2-ethylhexylene group, a nonylene group, and a decylene group. Among them, a linear alkylene group is preferred.

The NCO content in the isocyanate compound (b) is, for example, from 17 to 25 wt. %, preferably from 18 to 24 wt. %, and more preferably from 19 to 23 wt. %.

The isocyanate compound (B) may contain one, or two or more additional isocyanate compound(s) other than the isocyanate compound (b). Examples of the additional isocyanate compound include aliphatic polyisocyanates, such as 1,6-hexamethylene diisocyanate, 2,2,4-trimethylhexamethylene diisocyanate, and 2,4,4-trimethylhexamethylene diisocyanate; trimers of the aliphatic polyisocyanate (excluding the isocyanate compound (b)); allophanates, biurets, or adducts of the aliphatic polyisocyanate; aromatic polyisocyanates, such as triylene diisocyanate, xylylene diisocyanate, and diphenylmethane diisocyanate; alicyclic polyisocyanates, such as polyisocianates obtained by hydrogenating an aromatic polyisocianate, 4,4'-dicyclohexylmethane diisocyanate, and isophorone diisocyanate; and trimers, allophanates, biurets, or adducts of the aromatic polyisocyanate or the alicyclic polyisocyanate.

The isocyanate compound (B) contains the isocyanate compound (b), for example, in an amount of preferably 60 wt. % or higher (more preferably 70 wt. % or higher, even more preferably 80 wt. % or higher, and particularly preferably 90 wt. % or higher) relative to the total amount of the isocyanate compound (B) from the viewpoint of improving the hardness and chemical resistance of the resulting cured product.

Composition

The composition of the present disclosure contains a polyol compound (A) and an isocyanate compound (B). For the contents of these, from the viewpoint of improving the hardness and chemical resistance of the resulting cured product, the equivalent ratio of the isocyanate group (NCO group) contained in the isocyanate compound (B) to the hydroxyl group (OH group) contained in the polyol compound (A), that is NCO/OH, is preferably in a range from 0.2 to 2.0, more preferably from 0.5 to 1.5, even more preferably from 0.7 to 1.3, and particularly preferably from 0.9 to 1.2.

In addition, the content of the isocyanate compound (B) in the composition is preferably from 40 to 140 parts by weight, more preferably from 50 to 130 parts by weight, and even more preferably from 60 to 120 parts by weight relative to 100 parts by weight of the polyol compound (A), from the viewpoint of improving the hardness and chemical resistance of the resulting cured product.

The composition of the present disclosure may further contain as necessary an inorganic particle, an organic particle, an additive, or the like.

Inorganic Particle

Inorganic particles that the composition of the present disclosure may further contain are not particularly limited, but examples include silica, alumina, mica, synthetic mica, talc, calcium oxide, calcium carbonate, zirconium oxide, titanium oxide, barium titanate, kaolin, bentonite, diatomaceous earth, boron nitride, aluminum nitride, silicon carbide, zinc oxide, cerium oxide, cesium oxide, magnesium oxide, glass beads, glass fibers, graphite, carbon nanotubes, calcium hydroxide, magnesium hydroxide, and aluminum hydroxide. Among these, from the viewpoint of improving the chemical resistance and scratch resistance of the coating film, silica is preferred.

Organic Particle

Organic particles that the composition of the present disclosure may further contain are not particularly limited, but examples include polyethylene wax, polypropylene wax, acrylic beads, and urethane beads. Among these, from the viewpoint of improving the texture (soft feel properties) of the coating film, a urethane bead is preferred.

Regardless of inorganic or organic, one type of these particles can be used alone or two or more types can be used in combination.

The particle sizes of the inorganic particles and the organic particles are not particularly limited but are, for example, preferably from 0.01 nm to 1 μm from the viewpoint of good appearance.

Additive

Examples of the additive that the composition of the present disclosure may further contain include surfactants, pigments, dyes, ultraviolet absorbers, light stabilizers, surface modifiers, antifoaming agents, wetting agents, dispersants, viscoelasticity modifiers, thixotropy-imparting agents, antiseptics, film-forming agents, plasticizers, penetrants, perfumes, bactericides, fungicides, ultraviolet absorbers, antioxidants, antistatic agents, flame retardants, and matting agents.

Among these, a surface modifier is preferred from the viewpoint of smoothing the coating film surface. Examples of the surface modifier include a polysiloxane derivative (C).

Examples of the polysiloxane derivative (C) include compounds having a polydimethylsiloxane skeleton. Among these, a polyether-modified polydimethylsiloxane is preferred, and in particular, a polyethylene oxide (or polypropylene oxide) addition polydimethylsiloxane is preferred.

The content of the polysiloxane derivative (C) is, for example, from 0.1 to 0.5 parts by weight relative to 100 parts by weight of a total of the polyol compound (A) and the isocyanate compound (B).

The content of the inorganic particle or the additive in the composition of the present disclosure is not particularly limited but is preferably 10 wt. % or lower relative to a total weight (100 wt. %) of non-volatile content of the composition.

Solvent

To the composition of the present disclosure can be added a solvent to adjust the viscosity. The solvent is represented, for example, by Formula (3):

[Chem. 11]

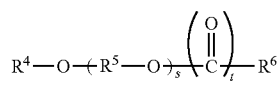

(3)

where in Formula (3), $R^4$ and $R^6$, each identical or different, represent a hydrogen atom or an alkyl group having from 1 to 5 carbon atom(s), $R^5$ represents an alkylene group having from 1 to 5 carbon atom(s), s represents an integer of 1 or greater, t represents 0 or 1, and when s is an integer of 2 or greater, each of a plurality of $R^5$ may be identical or different.

Examples of the alkyl group having from 1 to 5 carbon atom(s) in $R^4$ and $R^6$ include linear or branched alkyl groups, such as a methyl group, an ethyl group, a propyl group, an isopropyl group, a butyl group, an iso-butyl group, a s-butyl group, a t-butyl group, and a pentyl group.

Examples of the alkylene group having from 1 to 5 carbon atom(s) in $R^5$ include examples similar to those for $L^2$ in Formula (1a).

Examples of the solvent represented by Formula (3) include mono or poly(oxy $C_{1-6}$ alkylene) glycols, such as ethylene glycol, propylene glycol, butylene glycol, 1,3-butanediol, 1,4-butanediol, 1,6-hexanediol, diethylene glycol, and triethylene glycol; mono or poly(oxy $C_{1-6}$ alkylene) glycol mono($C_{1-4}$ alkyl ether)s, such as ethylene glycol monomethyl ether, diethylene glycol monomethyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, and dipropylene glycol monobutyl ether; mono or poly(oxy $C_{1-6}$ alkylene) glycol di($C_{1-4}$ alkyl ether)s, such as ethylene glycol dimethyl ether, diethylene glycol dimethyl ether, propylene glycol dimethyl ether, propylene glycol methyl ethyl ether, propylene glycol methyl propyl ether, propylene glycol methyl butyl ether, dipropylene glycol dimethyl ether, dipropylene glycol methyl propyl ether, and dipropylene glycol methyl butyl ether; and mono or poly(oxy $C_{1-6}$ alkylene) glycol mono ($C_{1-4}$ alkyl ether) mono($C_{1-4}$ alkyl ester)s, such as ethylene glycol monoethyl ether acetate, ethylene glycol monopropyl ether acetate, ethylene glycol monobutyl ether acetate, diethylene glycol monoethyl ether acetate, diethylene glycol monobutyl ether acetate, propylene glycol monoethyl ether acetate, dipropylene glycol monomethyl ether acetate, dipropylene glycol monoethyl ether acetate, and 3-methoxy butanol acetate. These can be used alone, or in a combination of two or more.

The solvent represented by Formula (3) is preferably a mono or poly(oxy $C_{1-6}$ alkylene) glycol mono($C_{1-4}$ alkyl ether) mono($C_{1-4}$ alkyl ester), and particularly a mono or poly(oxyethylene) glycol monoethyl ether monoacetate from the viewpoint of high solubility and excellent handleability.

A different solvent other than the solvent represented by Formula (3) above may be used in the composition of the present disclosure. Examples of the different solvent include ester-based solvents, such as acetate esters (such as ethyl acetate and butyl acetate); ether-based solvents, such as dioxane and tetrahydrofuran; ketone-based solvents, such as acetone; aromatic solvents, such as toluene and xylene; halogen-based solvents, such as dichloromethane and chloroform; alcohol-based solvents, such as methanol, ethanol, isopropanol, and butanol; and nitrile-based solvents, such as acetonitrile and benzonitrile. These can be used alone, or in a combination of two or more.

The content of the solvent (e.g., the solvent represented by Formula (3)) in the composition of the present disclosure is set to give a solid content concentration in the composition in a range from, for example, 70 to 99 wt. % (preferably 80 to 95 wt. %). In addition, the content of the solvent is preferably from 5 to 20 parts by weight, more preferably from 7 to 17 parts by weight, and even more preferably from 9 to 15 parts by weight relative to 100 parts by weight of a total of the polyol compound (A) and the isocyanate compound (B).

The composition of the present disclosure can be produced by mixing the above components. In using the composition of the present disclosure as a coating agent, the composition is preferably used as a two-component coating agent, where the polyol compound (A) and the isocyanate compound (B) are preferably separately stored and mixed at the time of use.

The composition of the present disclosure has the above configuration, and thus subjecting the composition to heat treatment enables the polyol compound (A) and the isocyanate compound (B) to be urethane-bonded to form a cured product (i.e., a cured product including a polyurethane resin).

The heat treatment conditions are, for example, at 100 to 150° C. for approximately 0.5 to 12 hours. After completion of the heat treatment, the cured product may be further aged at a temperature of room temperature (from 1 to 30° C.) for approximately 12 to 60 hours.

The cured product thus obtained has excellent adhesion to a substrate (e.g., a plastic substrate, such as those of PET) and excellent scratch resistance.

The cured product has a high hardness, and the pencil hardness (by a method in accordance with JIS K5600) of, for example, H or higher, preferably 2H or higher, particularly preferably 3H or higher, and even more preferably 4H or higher. In addition, the Martens hardness of the cured product (determined by a push-in test in accordance with ISO 14577; unit in $N/mm^2$) is, for example, higher than 5.0 and 75.0 or lower, and preferably from 5.3 to 60.0.

The cured product has excellent chemical resistance; for example, a sunscreen adhered to the cured product does not make the surface swell, or cause white cloudiness to occur. That is, the cured product has excellent sunscreen resistance.

The cured product has the above properties in combination. Thus, the composition for forming the cured product is suitable as a coating agent for plastic molded products, such as extrusion-molded products, injection-molded products, and compression-molded products; and as a material for molded products, such as films. Examples of the plastic molded product include parts for constituting housings of home electric appliances (such as refrigerators, washing machines, air conditioners, and television sets), housings of electronic devices (such as personal computers, mobile phones, and smartphones), and parts for constituting musical instruments (such as pianos, electronic organs, and electronic musical instruments); and parts for vehicles, such as automobiles and railway vehicles, (interior materials, such as instrument panels, door trims, headlinings, and tonneau covers; and exterior materials, such as bumpers).

In addition, examples of the plastic forming the plastic molded product include thermoplastic resins and thermosetting resins.

Examples of the thermoplastic resin include polyolefin-based resins, such as polyethylenes and polypropylenes; styrene-based resins, such as polystyrenes; polyesters, such as poly(ethylene terephthalate)s (PETs); vinyl chloride-based resins, such as vinyl chloride resins; polyamides, such as polyamide 46, polyamide 6, polyamide 66, polyamide 610, polyamide 612, polyamide 1010, polyamide 1012, polyamide 11, polyamide 12, and polyamide 1212; poly (phenylene ether)s, such as poly(2,6-dimethyl-1,4-phenylene ether); homopolymers or copolymers of acrylonitrile, such as PAN resins, AS resins, ABS resins, AAS resins, ACS resins, AES resins, and AXS resins; and (meth)acrylic resins, polycarbonates, polyacetals, poly(phenylene sulfide) s, poly(ether ether ketone)s, poly(amide-imide)s, polyimides, poly(ether imide)s, polysulfones, poly(ether sulfone)s, and modified products and derivatives of these resins, as well as polymer blends and polymer alloys containing these resins.

Examples of the thermosetting resin include phenol resins, urea resins, melamine resins, unsaturated polyesters, furan resins, epoxy resins, polyurethanes, allyl resins, and polyimides.

Plastic Molded Product

A plastic molded product formed from a coating including the cured product of the present disclosure on at least a portion of the surface has excellent scratch resistance, chemical resistance, and the like.

The thickness of the coating is not particularly limited and is, for example, approximately from 20 to 150 μm.

In addition, the plastic molded product formed using the composition itself as a material has a surface including the cured product and thus likewise also has excellent scratch resistance, chemical resistance, and the like.

The various configurations, combinations thereof, and the like of each embodiment described above are merely examples, and various configurational additions, omissions, substitutions, and other changes may be made as appropriate within a range that does not depart from the spirit of invention according to the present disclosure. The invention according to the present disclosure is not limited by the embodiments and is limited only by the claims.

Each aspect disclosed in the present specification can be combined with any other feature disclosed herein.

EXAMPLES

Hereinafter, the present disclosure will be described more specifically with reference to examples, but the present disclosure is not limited by these examples.

Synthesis Example 1

To a five-neck flask equipped with a reflux condenser, a thermometer, an air gas introduction tube, and a stirring device, 1306 g of tris(2-hydroxyethyl)isocyanurate, 1694 g of ε-caprolactone, and 6 mg of tin (II) octanoate were added in a nitrogen gas atmosphere, and then the internal temperature was heated to 170° C.

The concentration of the residual ε-caprolactone was determined to be less than 1.0% by gas chromatographic analysis, and then the mixture was cooled and taken out of the five-neck flask. The resulting compound (a1-1) had a number average molecular weight (Mn) of 611, a molecular weight dispersity (Mw/Mn) of 1.2, and a viscosity of 14.3 [Pa·s/25° C.].

For the measurement of the molecular weight of the resulting compound, the number average molecular weight (Mn) and weight average molecular weight (Mw) were determined by comparison with polystyrene standards using a high-speed GPC apparatus, and the molecular weight dispersity (Mw/Mn) was calculated.

The measurement conditions were as follows.

Measuring apparatus: a high-speed GPC apparatus "HLC-8220GPC", available from Tosoh Corporation Mobile phase: tetrahydrofuran Example 1

In a 50-mL glass container, a polyol compound (A), an isocyanate compound (B), a surface modifier, and a solvent were placed as described in Table 1, mixed, and defoamed.

The resulting composition was applied to a polyethylene terephthalate film (Cosmoshine A4100 #100, available from Toyobo Co., Ltd.) to give a coating thickness of 90 μm using an applicator, cured and dried in an oven at 120° C. for two hours, further cured under constant temperature and humidity conditions of 23° C. and 50% RH for 48 hours, and a cured coating/PET film laminate was obtained accordingly.

Examples 2 to 5 and Comparative Examples 1 to 6

Compositions were obtained in the same manner as in Example 1 except that the formulations of the compositions were changed as described in Table 1.

The cured coatings of the laminates obtained in the examples and comparative examples were evaluated for pencil hardness, Martens hardness, scratch resistance, and sunscreen resistance by the following methods.

Pencil Hardness

The pencil hardness of the surface on the cured coating side of the laminates obtained in the examples and comparative examples was evaluated by the method in accordance with JIS K5600. That is, the surface on the cured side of the laminate was rubbed with a pencil (pencil lead), and a laminate in which a scratch was observed on the surface was determined to be NG (poor). Specifically, the evaluation was performed using a pencil with a predetermined hardness, and when no scratch was made, another evaluation was performed with a pencil with a hardness one grade higher, and this operation was repeated. Once a scratch was observed, the laminate was re-evaluated with a hardness one grade lower, and when no scratch was observed, the laminate was evaluated again using a pencil with a hardness one grade higher. When reproducibility was confirmed twice or more, the hardness of the hardest pencil with which no scratch was made was determined as the pencil hardness of the cured coating. For the laminates used in the test, those laminates subjected to moisture control under a constant temperature and humidity chamber at 23° C. and 50% RH for 24 hours were used.

Pencil for evaluation: a "Pencil for Pencil Hardness Test" available from Mitsubishi Pencil Co., Ltd.
Load: 750 gf
Scratch distance: 7 mm or longer
Scratch angle: 450
Measurement environment: 23° C., 50% RH Martens Hardness The Martens hardness of the surface on the cured coating side of the laminates obtained in the examples and comparative examples was measured using a Shimadzu Dynamic Ultra-Micro Hardness Tester DUH-211 (available from Shimadzu Corporation). The Martens hardness is a value determined by the quotient of the test load and the surface area penetrated by an indenter and is an index of surface hardness.

Scratch Resistance

For the scratch resistance of the cured coating side surface of the laminates obtained in the examples and comparative examples, a scratch test was performed by attaching a steel wool (B-204, Bonstar for commercial use #0000) to a rubbing tester (Standard Model, available from Nippon Rika Industries Corporation) and reciprocating the steel wool (10 reciprocations or 20 reciprocations) on the coating with a load of 500 g applied. The initial gloss (60-degree gloss) ($G_0$) before the scratch test on the cured coating side surface and the gloss (60-degree gloss) ($G_1$) after 2 minutes of the scratch test were measured using a gloss meter (Gloss Meter VG7000, available from Nippon Denshoku Industries Co., Ltd.), and the scratch resistance was evaluated by calculating the retention rate of the gloss by the following equation.

Retention rate of gloss after scratch test=$(G_1)/(G_0)\times 100(\%)$

In addition, the laminate after scratching was allowed to stand under constant temperature and humidity conditions of 23° C. and 50% RH for 24 hours, and the gloss (60-degree gloss) ($G_2$) of the coating after standing was measured, and the scratch recovery was evaluated by calculating the retention rate of the gloss to the initial gloss (60-degree gloss, $G_0$) by the following equation.

Scratch recovery=$(G_2)/(G_0)\times 100(\%)$

Excellent: The retention rate of the gloss was 90% or higher
Good: The retention rate of the gloss was less than 90% and 80% or higher
Slightly poor: The retention rate of the gloss was less than 80%
Poor: The coating film peeled off and the gloss was not measurable Sunscreen Resistance (Immersion Method)

The entire surface on the cured coating side of a test specimen (rectangle, 2 cm$^2$) of the laminates obtained in the examples and comparative examples was brought into contact with 0.4 g of a sunscreen cream ("Ultra Sheer Dry-Touch SPF45" available from Neutrogena Corporation) weighed on a slide glass (contact area of the cured coating and the sunscreen cream: 0.1 g/cm$^2$). The entire cured coating was covered with a polyvinylidene chloride film, and the test specimen was allowed to stand in an oven at 80° C. for 5 hours, then the sunscreen cream was wiped off, and the adhesive state of the cured coating was evaluated according to the criteria below. The following indicates that a cured coating harder to peel off had better adhesion to a substrate.

Evaluation Criteria
Good: The cured coating did not peel off
Slightly poor: A portion of the cured coating peeled off
Poor: The cured coating completely peeled off After the sunscreen resistance test, the cured test specimen was allowed to stand on a flat surface with the coating side surface of the cured test specimen on the back side, and the height (mm) of each vertex from the flat surface was measured. The total value for the heights of each of the vertex (four locations) was evaluated as a curl (mm).

Sunscreen Resistance (Drip Method)

To the surface of the cured coating side of the laminate obtained in the examples and comparative examples was applied with a sunscreen cream ("Ultra Sheer Dry-Touch SPF45" available from Neutrogena Corporation) in an amount of 0.025 g/cm$^2$, and the laminate was allowed to stand in an oven at 50° C. for one hour. The sunscreen cream was then wiped off, and the appearance of the cured coating was evaluated according to the following criteria.

Evaluation Criteria
Excellent: Almost no change in appearance was observed for the cured coating
Good: A chemical solution trace remained on the cured coating
Slightly poor: The cured coating swelled
Poor: The cured coating swelled and whitened The results are summarized and shown in Table 1 below.

The cured coatings for Examples 1 to 5 obtained using the polyol compound (a1), or the polyol compound (a1) and the polyol (a2) as the polyol compound (A) all had excellent hardness with a pencil hardness of 4H or H and were rated excellent or good for scratch resistance and excellent or good for sunscreen resistance, exhibiting excellent adhesion, scratch resistance, and chemical resistance.

The cured coatings for Comparative Examples 1 and 2 obtained using a triol having no isocyanurate skeleton in place of the polyol compound (a1) were rated excellent for scratch resistance but poor or slightly poor for sunscreen resistance (adhesiveness), exhibiting poor adhesion. In addition, the cured coatings for Comparative Examples 3 to 6 obtained using only the polyol (a2) as the polyol compound (A) without using the polyol compound (a1) were rated poor or slightly poor in any of the evaluations of scratch resistance and sunscreen resistance, exhibiting insufficiency in any of adhesion, scratch resistance, or chemical resistance.

TABLE 1

| | | | Examples | | | | | Comparative Examples | | | | | |
|---|---|---|---|---|---|---|---|---|---|---|---|---|---|
| | | | 1 | 2 | 3 | 4 | 5 | 1 | 2 | 3 | 4 | 5 | 6 |
| Polyol compound (A) | a1-1 | Weight | 43.7 | 40.3 | 40.4 | 25.2 | 29.5 | 0 | 0 | 0 | 0 | 0 | 0 |
| | a2-1 | | 0 | 3.9 | 0 | 0 | 0 | 0 | 0 | 49.9 | 0 | 0 | 0 |
| | a2-2 | | 0 | 0 | 3.6 | 20.4 | 0 | 0 | 0 | 0 | 48.0 | 0 | 0 |
| | a2-3 | | 0 | 0 | 0 | 0 | 23.9 | 0 | 0 | 0 | 0 | 0 | 0 |
| | a2-4 | | 0 | 0 | 0 | 0 | 0 | 0 | 0 | 0 | 0 | 63.4 | 0 |
| | a2-5 | | 0 | 0 | 0 | 0 | 0 | 0 | 0 | 0 | 0 | 0 | 61.4 |
| Triol (containing no isocyanurate skeleton) | 1 | | 0 | 0 | 0 | 0 | 0 | 41.6 | 0 | 0 | 0 | 0 | 0 |
| | 2 | | 0 | 0 | 0 | 0 | 0 | 0 | 42.6 | 0 | 0 | 0 | 0 |
| Polyisocyanate compound (B) | | | 46.0 | 45.5 | 45.7 | 44.2 | 36.3 | 48.1 | 47.2 | 39.8 | 41.7 | 26.3 | 28.4 |
| Surface modifier | | | 0.3 | 0.3 | 0.3 | 0.3 | 0.3 | 0.3 | 0.3 | 0.3 | 0.3 | 0.3 | 0.3 |
| Solvent | | | 10.0 | 10.0 | 10.0 | 10.0 | 10.0 | 10.0 | 10.0 | 10.0 | 10.0 | 10.0 | 10.0 |
| NCO/OH | | Equivalent ratio | 1.05 | 1.05 | 1.05 | 1.05 | 1.05 | 1.05 | 1.05 | 1.05 | 1.05 | 1.05 | 1.05 |
| Solid content concentration | | wt. % | 90 | 90 | 90 | 90 | 90 | 90 | 90 | 90 | 90 | 90 | 90 |
| Pencil hardness | | — | | 4H | 4H | 4H | 4H | H | 3H | 3H | H | H | H | — |
| Martens hardness | | N/mm$^2$ | 58.7 | 15.2 | 21.2 | 5.7 | 5.3 | 7.0 | 11.1 | 5.1 | 5.1 | 8.7 | 40.2 |
| 10-Reciprocating scratch resistance (2 min after test) | | | Good | Excellent | Excellent | Excellent | Excellent | Excellent | Excellent | Good | Excellent | Good | Slightly poor |
| 10-Reciprocating scratch recovery (24 hours after test) | | | Excellent | Excellent | Excellent | Excellent | Excellent | Excellent | Excellent | Excellent | Excellent | Good | Excellent |
| 20-Reciprocating scratch resistance (2 min after test) | | | Excellent | Excellent | Excellent | Excellent | Excellent | Excellent | Excellent | Poor | Poor | Poor | Good |
| 20-Reciprocating scratch recovery (24 hours after test) | | | Excellent | Excellent | Excellent | Excellent | Excellent | Excellent | Excellent | Poor | Poor | Poor | Excellent |
| Sunscreen resistance (immersion method), adhesiveness | | | Good | Good | Good | Good | Good | Poor | Slightly poor | Good | Poor | Poor | Slightly poor |
| Sunscreen resistance (immersion method), curl | | | 5.4 | 4.0 | 3.8 | 4.3 | 4.4 | — | — | 17.5 | — | — | — |
| Sunscreen resistance (drip method) | | | Excellent | Good | Good | Good | Good | Good | Excellent | Poor | Good | Slightly poor | Good | a1-1: a compound (a1-1) obtained by Synthesis Example 1 a2-1: Trade name "PLACCEL 205U" (polycaprolactone diol, Mn 662, Mw/Mn 1.4, hydroxyl value from 207 to 217, available from Daicel Corporation)

a2-2: Trade name "PLACCEL CD205PL" (polycarbonate diol, Mn 677, Mw/Mn 1.8, hydroxyl value from 215 to 235, available from Daicel Corporation)

a2-3: Trade name "PLACCEL 220EC" (polycarbonate polyester diol, Mn 2166, Mw/Mn 2.5, hydroxyl value from 54 to 58, available from Daicel Corporation)

a2-4: Trade name "PLACCEL CD210" (polycarbonate diol, Mn 1355, Mw/Mn 2.3, hydroxyl value from 107 to 117, available from Daicel Corporation)

a2-5: Trade name "ETERNACOL UM90 (3/1)" (polycarbonate diol, Mn 1096, Mw/Mn 2.1, hydroxyl value from 115 to 135, available from Ube Industries, Ltd.)

1: Trade name "PLACCEL 305" (polycaprolactone triol, Mn 640, Mw/Mn 1.4, available from Daicel Corporation)

2: Trade name "PLACCEL CD305" (polycarbonate triol, Mn 600, Mw/Mn 1.9, available from Daicel Corporation)

B: Trade name "Takenate D-170N" (an isocyanurate-modified product of hexamethylene diisocyanate, available from Mitsui Chemicals, Inc.)

Surface modifier: an ether-modified polydimethylsiloxane, BYK-306 (available from BYK Japan KK)

Solvent: diethylene glycol monoethyl ether acetate, a reagent available from Tokyo Chemical Industry Co., Ltd.

To summarize the above, configurations and variations of the invention according to the present disclosure will be described below.

[1] A composition containing a polyol compound (A) and an isocyanate compound (B), the polyol compound (A) containing a compound (a1) having a number average molecular weight calibrated with polystyrene standards of less than 800, the compound (a1) being represented by Formula (1), where $R^1$ to $R^3$ in Formula (1), each identical or different, are a group represented by Formula (1a); and the isocyanate compound (B) containing a compound (b) represented by Formula (2), where $L^3$ to $L^5$ in Formula (2), each identical or different, represent a hydrogen atom, an NCO group, or an alkyl group having from 1 to 10 carbon atom(s) and having a group represented by Formula (2').

[2] The composition according to [1], in which $L^1$ in Formula (1a) is an alkylene group having from 1 to 3 carbon atom(s).

[3] The composition according to [1] or [2], in which $L^2$ in Formula (1a) is an alkylene group having from 1 to 8 carbon atom(s) (preferably from 4 to 6 carbon atoms).

[4] The composition according to [3], in which $L^2$ in Formula (1a) is a linear alkylene group.

[5] The composition according to any one of [1] to [4], in which m in Formula (1a) is 0 or greater (preferably from 0 to 7, more preferably from 0 to 4, even more preferably from 0 to 3, particularly preferably from 0 to 2, and most preferably from 1 to 2).

[6] The composition according to any one of [1] to [5], in which the number average molecular weight of the compound (a1) is from 570 to 630 (preferably from 580 to 620 and more preferably from 590 to 610).

[7] The composition according to any one of [1] to [6], in which a molecular weight dispersity of the compound (a1) is from 1.0 to 1.5 (preferably from 1.0 to 1.3 and more preferably from 1.0 to 1.2).

[8] The composition according to any one of [1] to [7], in which a hydroxyl value of the compound (a1) is from 200 to 400 KOH mg/g (preferably from 260 to 300 KOH mg/g, more preferably from 270 to 290 KOH mg/g, and even more preferably from 275 to 285 KOH mg/g).

[9] The composition according to any one of [1] to [8], in which $L^3$ to $L^5$ is an alkyl group having from 3 to 8 carbon atoms (preferably from 4 to 8 carbon atoms).

[10] The composition according to any one of [1] to [9], in which the polyol compound (A) further contains a polyol (a2) in an amount ranging from 0.01 to 1.5 parts by weight relative to 1 part by weight of the compound (a1), the polyol (a2) having a hydroxyl value (KOH mg/g) from 30 to 300.

[11] The composition according to [10], in which the polyol (a2) is at least one selected from a polyester polyol, a polyether polyol, and a polycarbonate polyol.

[12] The composition according to [10], in which the polyol (a2) is at least one selected from a polyester polyol and a polycarbonate polyol.

[13] The composition according to any one of [10] to [12], in which the hydroxyl value of the polyol (a2) is from 40 to 270 KOH mg/g (preferably from 50 to 250 KOH mg/g).

[14] The composition according to any one of [10] to [13], in which a content of the polyol (a2) is from 0.03 to 1.2 parts by weight (preferably from 0.05 to 1.0 parts by weight and more preferably from 0.08 to 0.9 parts by weight) relative to 1 part by weight of the compound (a1).

[15] The composition according to any one of [10] to [14], in which a number average molecular weight of the polyol (a2) is from 400 to 2500 (preferably from 450 to 2400, more preferably from 500 to 2300, and even more preferably from 500 to 2200).

[16] The composition according to any one of [10] to [15], in which a molecular weight dispersity of the polyol (a2) is from 1 to 3.

[17] The composition according to any one of [1] to [16], in which a content of the polyol (a2) is from 0.01 to 2.5 mol (preferably from 0.03 to 2.0 mol, more preferably from 0.05 to 1.5 mol, and even more preferably from 0.08 to 1.0 mol) per mol of the compound (a1).

[18] The composition according to any one of [1] to [17], in which $L^6$ and $L^7$ in Formula (2') for the compound (b) are a linear alkylene group.

[19] The composition according to any one of [1] to [18], in which an NCO content in the isocyanate compound (B) is from 17 to 25 wt. % (preferably from 18 to 24 wt. % and more preferably from 19 to 23 wt. %).

[20] The composition according to any one of [1] to [19], in which the isocyanate compound (B) contains at least one isocyanate compound other than the compound (b), the at least one isocyanate compound being selected from: 1,6-hexamethylene diisocyanate; 2,2,4-trimethylhexamethylene diisocyanate; 2,4,4-trimethylhexamethylene diisocyanate; polyisocyanates obtained by hydrogenating xylylene diisocyanate; polyisocyanates obtained by hydrogenating diphenylmethane diisocyanate; 4,4'-dicyclohexylmethane diisocyanate; isophorone diisocyanate; trimers of these diisocyanates (excluding the isocyanate compound (b)); allophanates of these diisocyanates; biurets of these diisocyanates; and adducts of these diisocyanates.

[21] The composition according to any one of [1] to [20], in which a content of the compound (b) in the isocyanate compound (B) is 60 wt. % or higher (preferably 70 wt. % or higher, more preferably 80 wt. % or higher, and even more preferably 90 wt. % or higher).

[22] The composition according to any one of [1] to [21], in which an equivalent ratio of an NCO group contained in the isocyanate compound (B) to an OH group contained in the polyol compound (A), that is NCO/OH, is in a range from 0.2 to 2.0 (preferably from 0.5 to 1.5, more preferably from 0.7 to 1.3, and even more preferably from 0.9 to 1.2).

[23] The composition according to any one of [1] to [22], further containing from 0.1 to 0.5 parts by weight of a polysiloxane derivative (C) relative to 100 parts by weight of a total of the polyol compound (A) and the isocyanate compound (B).

[24] The composition according to [23], in which the polysiloxane derivative (C) is a compound having a polydimethylsiloxane skeleton (preferably a polyether-modified polydimethylsiloxane and more preferably a polyethylene oxide addition polydimethylsiloxane).

[25] The composition according to any one of [1] to [24], further containing a solvent represented by Formula (3).

[26] The composition according to [25], in which the solvent represented by Formula (3) is at least one selected from: ethylene glycol; propylene glycol; butylene glycol; 1,3-butanediol; 1,4-butanediol; 1,6-hexanediol; diethylene glycol; triethylene glycol; ethylene glycol monomethyl ether; diethylene glycol monomethyl ether; propylene glycol monomethyl ether; propylene glycol monoethyl ether; propylene glycol monopropyl ether; propylene glycol monobutyl ether; dipropylene glycol monomethyl ether; dipropylene glycol monoethyl ether; dipropylene glycol monopropyl ether; dipropylene glycol monobutyl ether; ethylene glycol dimethyl ether; diethylene glycol dimethyl ether; propylene glycol dimethyl ether; propylene glycol methyl ethyl ether; propylene glycol methyl propyl ether; propylene glycol methyl butyl ether; dipropylene glycol dimethyl ether; dipropylene glycol methyl propyl ether; dipropylene glycol methyl butyl ether; ethylene glycol monoethyl ether acetate; ethylene glycol monopropyl ether acetate; ethylene glycol monobutyl ether acetate; diethylene glycol monoethyl ether acetate; diethylene glycol monobutyl ether acetate; propylene glycol monoethyl ether acetate; dipropylene glycol monomethyl ether acetate; dipropylene glycol monoethyl ether acetate; and 3-methoxy butanol acetate.

[27] The composition according to [25], in which the solvent represented by Formula (3) is at least one selected from: ethylene glycol monoethyl ether acetate; ethylene glycol monopropyl ether acetate; ethylene glycol monobutyl ether acetate; diethylene glycol monoethyl ether acetate; diethylene glycol monobutyl ether acetate; propylene glycol monoethyl ether acetate; dipropylene glycol monomethyl ether acetate; dipropylene glycol monoethyl ether acetate; and 3-methoxy butanol acetate.

[28] The composition according to [25], in which the solvent represented by Formula (3) is at least one selected from ethylene glycol monoethyl ether acetate and diethylene glycol monoethyl ether acetate.

[29] The composition according to any one of [1] to [28], which is a coating agent.

[30] A cured product of the composition described in any one of [1] to [29].

[31] A plastic molded product, having at least a portion of a surface being covered with a coating including the cured product described in [30].

INDUSTRIAL APPLICABILITY

The composition of the present disclosure forms a cured product having excellent adhesion to a substrate, hardness, scratch resistance, and chemical resistance, and thus using the composition as a coating agent to cover a substrate enables the substrate to have the properties described above. In addition, the plastic molded product having at least a portion of its surface is covered with the cured product of the composition of the present disclosure has high surface hardness, excellent scratch resistance and chemical resistance. Thus, touching the plastic molded product, for example, with a hand to which sunscreen has been applied does not peel off or whiten the plastic cured product covering its surface, and the plastic molded product retains excellent appearance, adhesion, hardness, and scratch resistance over a long period of time.

The invention claimed is:

1. A composition comprising:
a polyol compound (A) and
an isocyanate compound (B),
wherein the polyol compound (A) comprises a compound (a1) having a number average molecular weight calibrated with polystyrene standards of less than 800, the compound (a1) being represented by Formula (1):

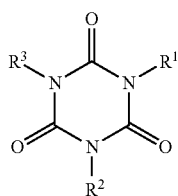

(1)

wherein in Formula (1), $R^1$ to $R^3$, each identical or different, are a group represented by Formula (1a):

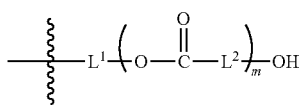

(1a)

wherein in Formula (1a), $L^1$ and $L^2$, each identical or different, represent an alkylene group having from 1 to 10 carbon atom(s), and m represents a number of 0 or greater, except m does not simultaneously equal 0 for $R^1$ to $R^3$, and the bond with the wavy line binds to a nitrogen atom in Formula (1); and wherein the isocyanate compound (B) comprises a compound (b) represented by Formula (2):

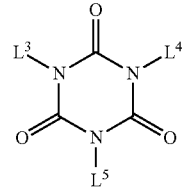

(2)

wherein in Formula (2), $L^3$ to $L^5$, each identical or different, represent a hydrogen atom, an NCO group, or an alkyl group having from 1 to 10 carbon atom(s) and having a group represented by Formula (2'), except $L^3$ to $L^5$ do not simultaneously represent hydrogen atoms:

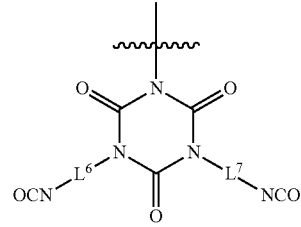

(2')

wherein in Formula (2'), $L^6$ and $L^7$, each identical or different, represent an alkylene group having from 1 to 10 carbon atom(s), and the bond with the wavy line binds to a carbon atom of the alkyl group having from 1 to 10 carbon atom(s) in $L^3$ to $L^5$ in Formula (2); and wherein a content of the isocyanate compound (B) in the composition is from 40 to 140 parts by weight relative to 100 parts by weight of the polyol compound (A).

2. The composition according to claim 1, wherein the polyol compound (A) further comprises a polyol (a2) in an amount ranging from 0.01 to 1.5 parts by weight relative to 1 part by weight of the compound (a1), the polyol (a2) having a hydroxyl value (KOH mg/g) from 30 to 300.

3. The composition according to claim 1, wherein an equivalent ratio of an NCO group in the isocyanate compound (B) to an OH group in the polyol compound (A), that is NCO/OH, is in a range from 0.2 to 2.0.

4. The composition according to claim 1, further comprising a polysiloxane derivative (C) in an amount from 0.1 to 0.5 parts by weight relative to 100 parts by weight of a total of the polyol compound (A) and the isocyanate compound (B).

5. The composition according to claim 1, further comprising a solvent represented by Formula (3):

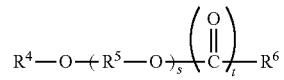

(3)

wherein in Formula (3), $R^4$ and $R^6$, each identical or different, represent a hydrogen atom or an alkyl group having from 1 to 5 carbon atom(s), $R^5$ represents an alkylene group having from 1 to 5 carbon atom(s), s represents an integer of 1 or greater, and t represents 0 or 1, and when s is an integer of 2 or greater, each of a plurality of $R^5$ is identical or different from each other.

6. The composition according to claim 1, wherein the composition is a coating agent.

7. A cured product of the composition described in claim 1.

8. A plastic molded product, having at least a portion of a surface being covered with a coating including the cured product described in claim 7.

\* \* \* \* \*